Jan. 11, 1955 R. J. MULLIGAN 2,699,275
METHOD AND MACHINE FOR APPLYING BUCKLES AND PRODUCT
Filed April 12, 1951 6 Sheets-Sheet 1

INVENTOR
ROBERT J. MULLIGAN.
BY
Arnold S. Worfolk
ATTORNEY

Jan. 11, 1955   R. J. MULLIGAN   2,699,275
METHOD AND MACHINE FOR APPLYING BUCKLES AND PRODUCT
Filed April 12, 1951   6 Sheets-Sheet 2

INVENTOR
ROBERT J. MULLIGAN.
BY
Arnold S. Worfork
ATTORNEY

Jan. 11, 1955   R. J. MULLIGAN   2,699,275
METHOD AND MACHINE FOR APPLYING BUCKLES AND PRODUCT
Filed April 12, 1951   6 Sheets-Sheet 3

INVENTOR
ROBERT J. MULLIGAN.
BY
Arnold S. Worfolk
ATTORNEY

United States Patent Office 2,699,275
Patented Jan. 11, 1955

2,699,275

METHOD AND MACHINE FOR APPLYING BUCKLES AND PRODUCT

Robert James Mulligan, New Brunswick, N. J., assignor to Johnson & Johnson, a corporation of New Jersey Application April 12, 1951, Serial No. 220,671

16 Claims. (Cl. 223—49)

This invention relates to a method and machine for automatically assembling a strip of belt material with one or more slide buckles to form a closed loop or belt adjustable as to size, and to the belt product.

In general, the type of belt resulting from practicing the instant invention is one whose ends present loops connected together by a clip or eyelet, with each loop in turn formed by a reverse fold whose lapped portions are connected together by a slide buckle which permits the adjustment.

According to the invention, a long narrow limp or flexible strip, preferably of elastic or non-elastic textile material, is stretched lengthwise between a pair of arms presented by the machine, which holds the strip above a clip or eyelet having a single aperture. The center of the strip is then forced downwardly through the clip to form a loop. Simultaneously therewith the ends of the strip are turned inwardly to a position permitting opposite sides of the loop to be brought into overlapping relation with the ends. A slide buckle is then presented beneath each of the overlaps and applied so as to connect the overlapped portions together.

The type of slide buckle used preferably is retangular in shape, differing however, from the usual type of buckle in that its crosspiece is formed by separate members projecting inwardly from its side elements and terminating short of the center to provide a medial gap large enough to permit passage therethrough of two layers of the strip material when longitudinally creased, but small enough to hold the two layers of strip material together when lying flat against the crosspiece.

The buckles are applied by presenting each of them beneath an overlapped portion of the strip and forcing the overlapped portions through the medial gap in the crosspiece until the lateral edges of the overlapped portions clear the ends of the crosspiece elements defining the gap. When the lateral edges have cleared the adjacent opposed ends of the crosspiece elements, inherent resiliency of the strip material causes the overlapped portions thereof to lie flat against the crosspiece elements when tension is applied.

Referring to the drawings.

Although the improved method and machine are herein described in connection with manufacturing a belt, it will be understood that the invention may be utilized in applying clips and adjustable slide devices to many other different types of products. The belt 10 illustrated in Figs. 13 and 14 comprises a strip of elastic or non-elastic textile material 11 whose ends are joined together by an eyelet or clip 12 of any suitable shape. The clip 12 which has been shown is triangular in shape (Fig. 16), and has a single aperture 13 through which the ends of the belt extend. The triangular shape is preferred for a belt of this type, i. e., a sanitary belt, since one of its flat sides may be disposed parallel to the edges of the belt to facilitate connecting to it a customary suspension tab (not shown).

Figures 11, 12, 13, 14, 15, 16, 17:
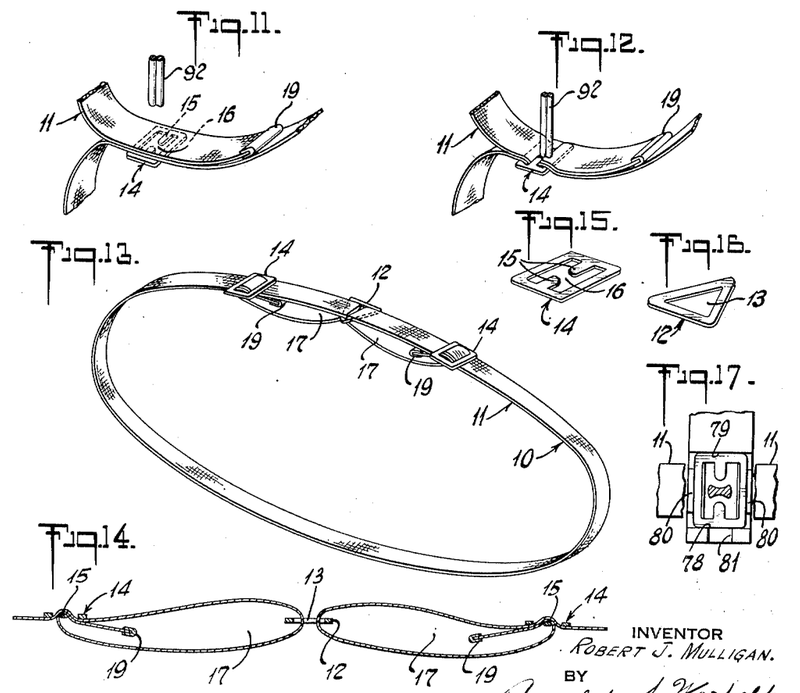
Fig. 11 illustrates, in perspective, portions of the strip material in overlapping relation just prior to application of a slide buckle.
Fig. 12 illustrates, in perspective, portions of the strip material in overlapping relation just after application of a slide buckle.
Fig. 13 illustrates, in perspective, a finished belt.
Fig. 14 illustrates, in longitudinal section, a portion of a belt to which clip and buckles have been applied.
Fig. 15 illustrates, in perspective, a type of slide buckle usable in practicing the invention.
Fig. 16 illustrates, in perspective, a single apertured eyelet or clip usable for joining the ends of the belt together.
Fig. 17 is a horizontal section on line 17—17 of Fig. 9.

The belt 10 is also provided with a slide buckle 14 on each side of the central triangular clip 12 to permit equality of linear adjustment in each half section of the belt for centralization of the clip 12 at all times. A slide buckle 14 of the type preferred is illustrated in Fig. 15. It is, preferably, rectangular in shape with medial extensions 15 projecting one from each of the opposed side sections of the buckle toward the center but terminating short of the center to define a centrally located gap 16 whose purpose presently will appear. Suffice it to say here, at each side of the clip 12, the strip material 11 passes beneath one end section of a buckle 14, over the medial extensions 15, and then beneath the other end section of the buckle (Figs. 13 and 14). Then, after passing through the clip 12, the strip doubles back upon itself to the slide buckle 14 to form a loop 17, the end thereof passing again around the medial section of the buckle in facewise contact with the other portion of the strip which passes therethrough and coming out within the confines of the loop. The size of each adjustable buckle 14 is such that the portions of the strip which pass through it in facewise contact are held together with friction sufficient to prevent inadvertent relative adjustment but not so tightly as to prevent any desired adjustment for size with appropriate manipulation.

Figures 1A, 2:
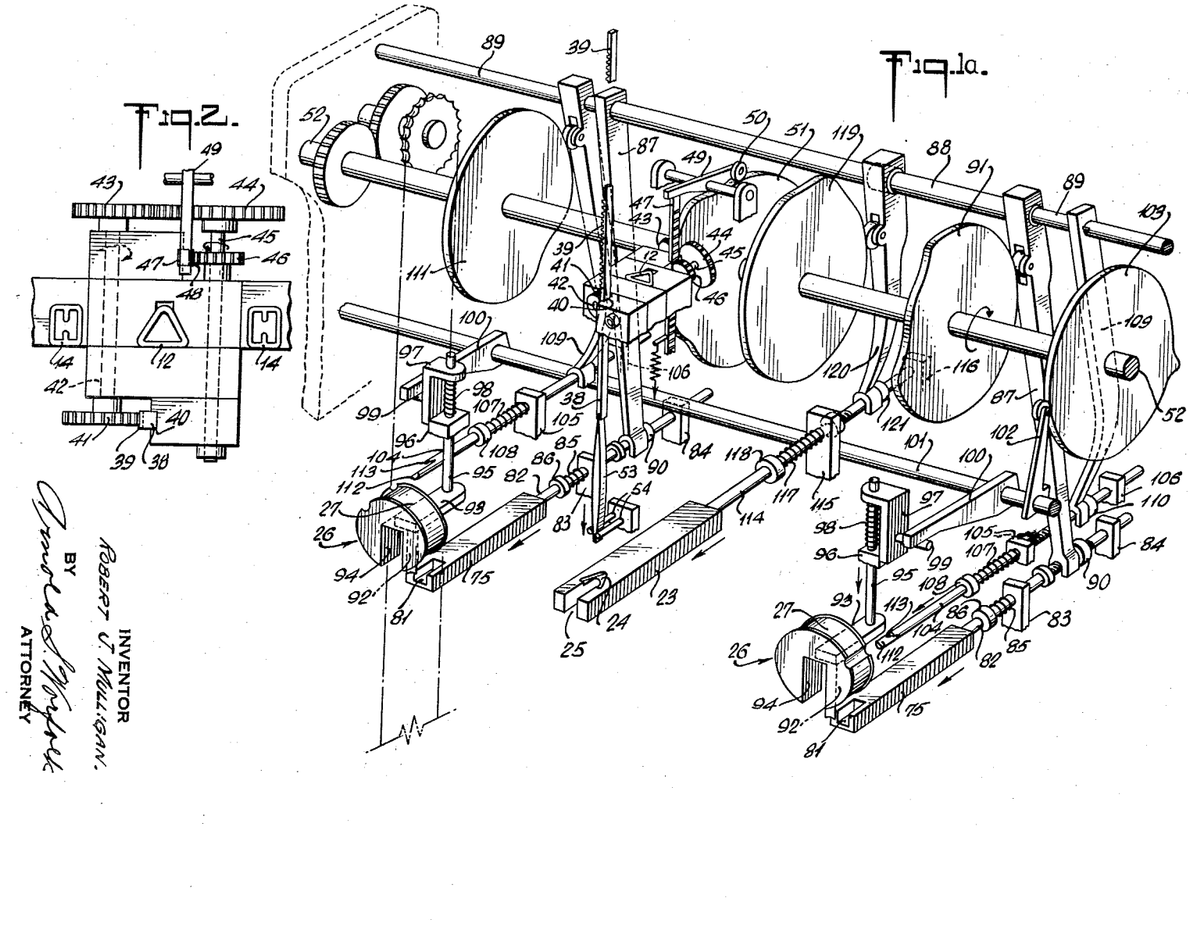
Figs. 1a and 1b, when arranged one above the other with Fig. 1a at the top, depict in perspective the operating parts of a machine for practicing the instant invention.
Fig. 2 is a plan view of a portion of the machine showing a magazine for the single apertured clips that join the ends of the strip material together to form the belt.
Figure 1B:
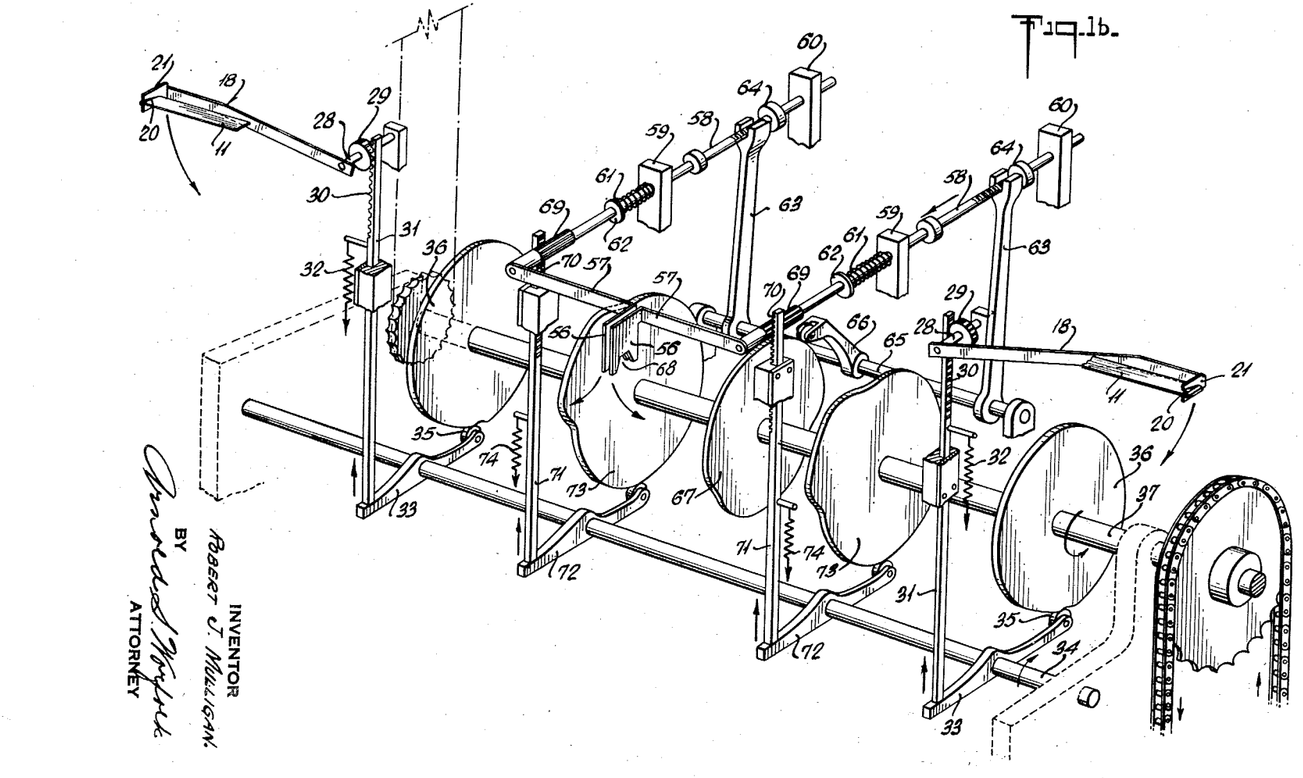
Figure 3:
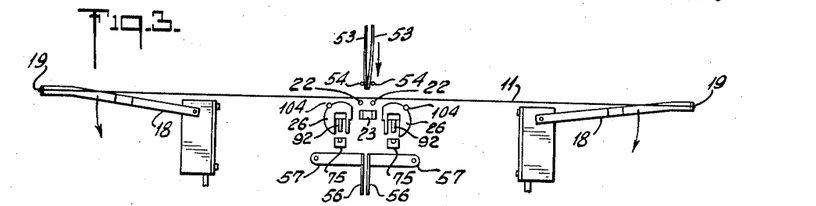
Figs. 3 to 8 inclusive illustrate diagrammatically different steps in the operation of looping the strip material to form the overlaps.

The first step in forming the closed belt and in applying the buckles thereto comprises stretching the strip material 11 between the ends of a pair of arms 18 located one at each side and at the front of the machine (Figs. 1a, 1b and 3). To facilitate this operation, the strip 11 is provided at each end with a flat ferrule or bead 19 of metal or otherwise, firmly secured thereto. The strip is slid edgewise into an open-ended slot 20 which extends rearwardly from the front edge of a flange 21 bent forwardly from the outer extremity of each of the arms 18. The strip is held in its initially stretched position in the machine by engagement of the beads 19 against the outer faces of the oppositely disposed flanges 21.

Figures 18, 19, 20, 21, 22, 23, 24, 25:
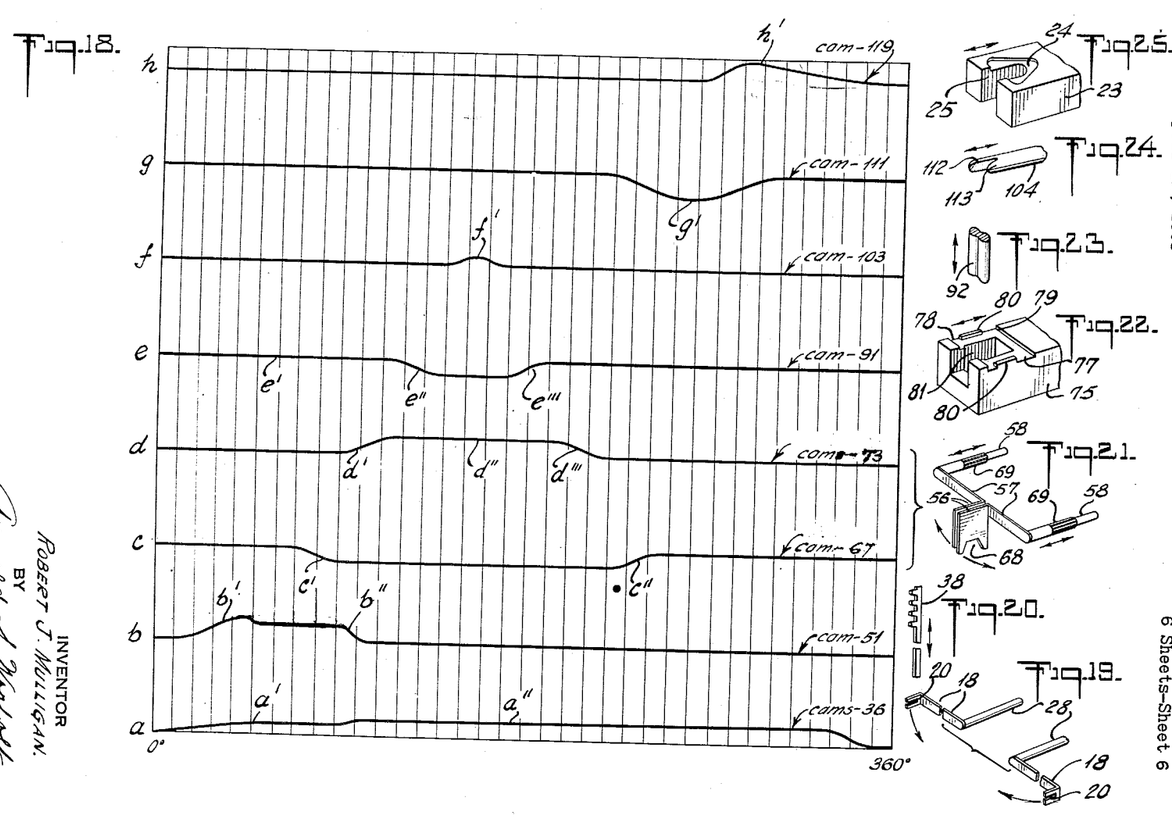
Fig. 18 is a chart of the cams operating various parts of the machine.
Figs. 19 to 25 inclusive illustrate, in perspective, parts of the machine operated by the various cams whose operations are charted in Fig. 18.

When the tape 11 is thus stretched between the ends of the arms 18, the center portion thereof is located immediately above a pair of spaced pins 22 fixed in the machine frame and which in turn are located immediately above a slide 23 mounted for limited sliding movement in a direction fore and aft of the machine (Figs. 1a, 3, and 25). The slide 23, near its front end and at the top, is suitably recessed as at 24 to receive one of the triangularly shaped eyelets or clips 12 and when the slide is in its foremost or normal position a clip located in the recess 24 rests directly beneath the tape.

Figure 4:
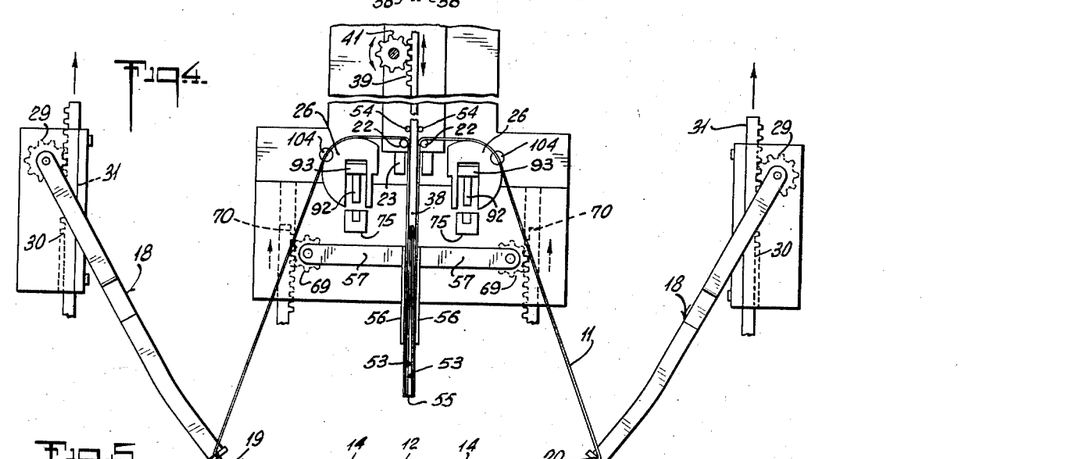

The recess 24 is as deep as the clip 12 is thick so that the top surface of a clip when resting in the slide 23 is flush with the top surface of the slide where it will not interfere with the top surface of the guideway which constrains the slide to move in its longitudinal fore and aft direction (Figs. 4 and 25). The slide 23 is also formed with a recess 25 extending inwardly from the front end thereof a distance sufficient to provide ample clearance beneath the aperture 13 in the clip 12 for a reason presently to appear.

Below the strip 11 and immediately adjacent each side of the slide 23, there is fixed a circular form 26 whose peripheral edge presents a circumferential groove 27 of width and depth substantially equivalent to the width and depth of the strip 11 and which will readily accommodate the strip when resting flatwise therein (Figs. 1a and 3).

The first operation in forming the belt after stretching between the arms 18, is effected by turning the arm 18 at the right of the machine in a clockwise direction and the corresponding arm 18 at the left of the machine in a counterclockwise direction (Figs. 1b and 4). For this purpose the arms 18 have their inner ends fixed at the front ends of a pair of shafts 28 journaled in the machine frame which for convenience in viewing the operating mechanism for the most part has been omitted. Also for convenience in viewing and understanding, the operating parts shown in Figs. 1a and 1b are spread out laterally of the machine more than normally would be the case. The shafts 28 each have a pinion 29 fixed thereto and which mesh with racks 30 formed near the upper ends of a pair of bars 31 guided for movement in a vertical direction. Tension springs 32 secured to the bars 31 and in the machine frame (not shown) urge the bars 31 into engagement with underlying levers 33 fulcrumed near their centers on a transverse shaft 34. The levers 33 present anti-friction rollers 35 at their rear ends arranged to track along identical edge cams 36 fixed on a lower transverse horizontal main cam shaft 37 of the machine. The cam shaft 37 is chain driven in a counterclockwise direction, looking at the machine from the right, from a suitable source of power not shown.

Upon initiation of a machine cycle of operation, rotation of the cams 36 lifts the bars 31 against spring tension to effect rotation of the arms 18 between which the strip 11 is stretched as set forth. Immediately thereafter, and as inward movement of the arms 18 provides slack in the strip 11 (Fig. 4), a push bar 38, vertically disposed above the strip 11, is moved downwardly to push the strip first between the pins 22 which together with the circular members 26 give support to the strip, and then through a clip 12 which, as will be recalled is located in the recess 24 directly beneath the strip 11 when the slide 23 is in its foremost or normal position.

The push bar 38 is formed at its upper end with a toothed rack portion 39 and is guided for vertical movement up and down in a guideway 40 presented by a fixed part of the machine (Figs. 1a and 2). The push bar 38 is held in its guideway by a pinion 41 whose teeth mesh with the rack 39 and whose rotation imparts vertical movement of the push bar. Pinion 41 is fixed at the front end of a fore and aft shaft 42 rotatably mounted in a fixed part of the machine. A pinion 43 fixed at the rear end of the shaft 42, meshing with a pinion 44 fixed at the rear end of a similarly mounted rotatable shaft 45 on which there is also fixed a smaller pinion 46 driven by the up and down movement of another rack bar 47 arranged in a guideway 48 likewise presented by a fixed part of the machine, provides an arrangement whereby a relatively small movement of the rack bar 47 in a given direction produces a relatively large movement of the push bar 38 in the same direction.

A lever 49, centrally fulcrumed, overlies, at its front end, the rack bar 47 and, at its rear end, carries an anti-friction roller 50 arranged to track along an edge cam 51 fixed on an upper cam shaft 52 journaled in the machine frame and chain driven from the lower cam shaft 37 in the opposite direction through an idler gear.

Shortly after the machine cycle has been inaugurated and as rotation of the arms 18 provides the necessary slack, a high portion of the cam 51 moves the lever 49 to press down on the rack bar 47 which through the mechanism just described projects the push bar 38 downwardly to push the strip 11 through the metal clip 12 in the manner earlier mentioned (Fig. 4).

The push bar 38 has secured at its lower end a pair of long relatively narrow flat leaf springs 53 which, when the bar 38 is in its normal or topmost position are held in substantially face to face contact by a pair of closely spaced pins 54 fixed in the front face of the portion of the machine that supports the bar 38. The pins 54 each engage one of the outer opposed faces of the springs 53 at a point sufficiently low down to insure that the lower ends of the springs will enter without interference the aperture 13 in the triangular clip 12 as it pushes the strip 11 before it.

As the arms 18 swing inwardly, all slack in the strip 11 is immediately taken up by the downward movement of the bar 38. During this phase of the operation, the strip slides in the direction of its length over the pins 22 and over the smooth cylindrical surfaces characteristic of the grooves 27 in the circular members 26 in which the strip is guided. The downward movement of the bar 38 forms a loop 55 in the strip below the triangular clip 12 and, as the leaf springs 53 are freed from restraint upon clearing the clip, they exert outward pressure against the inside faces of the loop, to prevent twisting in the loop which otherwise might result due to internal stresses in the strip material.

Figure 5:
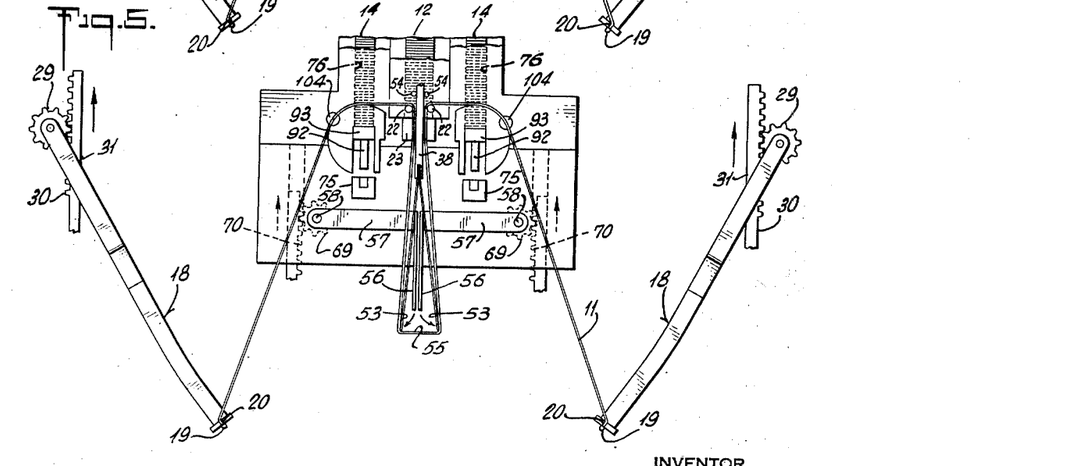

By reference to the chart (Fig. 18) and particularly lines a and b which depict respectively the characteristics of cams 36 operating arms 18 and cam 51 operating the plunger bar 38, it will be observed that there is a short dwell in cams 36 indicated by portion $a^1$ of line $a$, coincidental with a dwell in cam 51, indicated by portion $b^1$ of line $b$ which is somewhat lower than its initial high point. The position of the parts at this stage of the machine cycle is illustrated in Fig. 5. Therein it will be observed that push bar 38 after reaching its lowermost position has been retracted upwards slightly to provide sufficient slack in the strip 11 to permit spreading of the springs 53 with consequent lateral enlargement of the loop 55 as shown.

Figure 10:
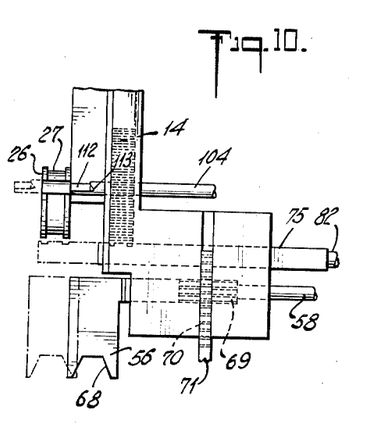
Fig. 10 is a side elevation of that portion of the machine on which the belt is formed.

With the loop 55 thus enlarged and thus maintained for a suitable period, opportunity is provided for entry into the loop from the rear, of a pair of wing members 56 (Figs. 1b, 5 and 10). The wing members 56 are flat plate elements of width greater than the width of the strip material 11 but of length substantially less than the length of the loop 55 as it exists in the position of the parts shown in Fig. 5. They are vertically disposed in parallel facewise juxtaposition and are arranged for edgewise movement in a fore and aft direction from their normal position shown in solid lines in Fig. 10 where they stand at the rear of the belt, to a forward position shown in dotted lines where they stand in the plane of and within the belt (see also Fig. 5).

The wing member 56 at the right is fixed at the left end of an arm 57 normally disposed in a horizontal position and which at its right end is fixed at the front end of a fore and aft shaft 58 (Figs. 1b and 5). The wing 56 at the left is fixed at the right end of an arm likewise denoted 57 since, except for direction of swinging movement (later described) it is otherwise the same as the arm 57 just referred to, and it too, at its left end is fixed at the front end of a fore and aft duplicate of the shaft 58. The shafts 58 are mounted for sliding movement in fixed supporting posts 59 and 60 spaced in a fore and aft direction and normally biased to move in a forward direction by compression springs 61 which react between the front faces of the respective posts 59 and a collar 62 fixed on each of the shafts in advance of its supporting post 59. The fore and aft position of the shafts, however, is determined by a pair of substantially vertical arms 63, one for each of the shafts 58, and which have bifurcated portions at the top straddling the shafts and bearing rearwardly against collars 64 fixed one on each of the said shafts 58.

The arms 63 are fixed at their lower ends on a common rock shaft 65, journaled in a fixed part of the machine and to which there is fixed a forwardly and upwardly inclined arm 66 having an anti-friction roller at its free end to track along an edge cam 67 fixed on the lower cam shaft 37. The arrangement of the parts is such that after the loop 55 has been formed in the textile strip as shown in Fig. 5, and while the plunger bar 38 is still in its lowermost position, a low portion of cam 67 comes opposite the anti-friction roller on arm 66 thereby permitting the arms 63 by virtue of their interconnection through the rock shaft 65 to swing forwardly and allow the shafts 58 by reaction of their springs 61 correspondingly to move forwardly to present the wings 56 in alignment with the belt strip 11 (see also Fig. 10). This operation is timed, as shown by portion $c^1$ of line $c$ of the cam chart (Fig. 18), to occur just before cam 51 acts to restore push bar 38 upwardly to its normal position through reverse operation of the previously described intermediate mechanism between these parts. The timing of this operation of restoration is indicated by portion $b^2$ of line $b$ on the chart (Fig. 18).

With the leaf springs 53 out of the way, wings 56 swing downwardly and outwardly, to engage the belt strip 11 in flare-sided notches 68 presented in their bottom edges and there then commences a process of enlarging the loop which involves pulling the strip material further along through the triangular clip 12. This is permitted because just prior to inaugurating the swinging movement of the wing members 56, further inwardly swinging movement of arms 18, which as will be recalled had been temporarily interrupted, is again initiated (Fig. 6).

Figure 8:
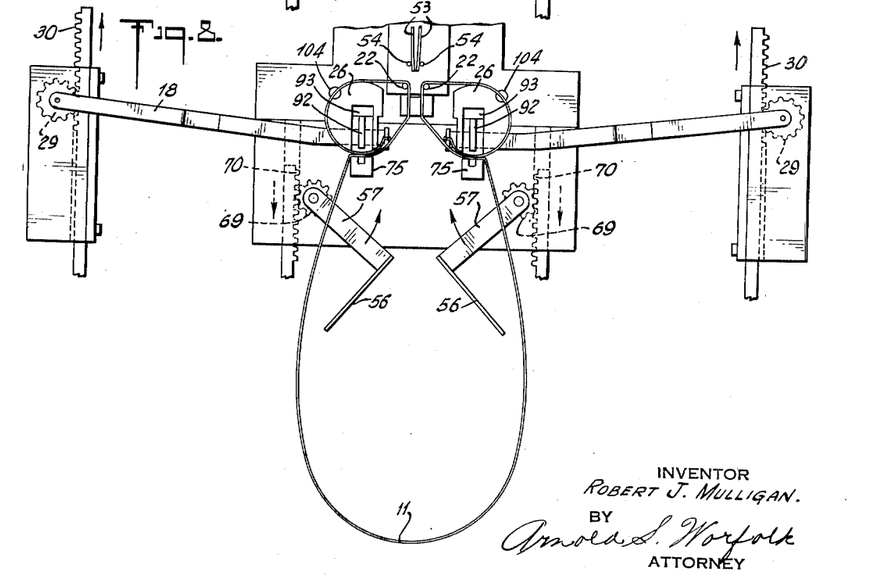

The wing members 56 are swung from their normal positions as shown in Figs. 1b and 5 through approximately 180° to the positions shown in Fig. 8 by rotation of the fore and aft shafts 58 on which are fixed the arms 57 carrying said wing members. The shafts 58 are provided near their front ends with pinions 69 meshing with racks 70 presented at the top of a pair of vertical bars 71 overlying a corresponding pair of centrally fulcrumed levers 72 in advance of the fulcrum points. The levers 72 are fulcrumed on the rock shaft 34 and provided at their rear ends with anti-friction rollers to track along edge cams 73 fixed on the lower cam shaft 37. The anti-friction rollers are constrained to track along the cams by tension springs 74 anchored to the vertical bars 71 and in the machine frame and which urge the bars downwardly.

The vertical bars 71 are guided in their up and down movement in a fixed portion of the machine frame and at the appropriate phase in the machine cycle are raised to rotate the shafts 58 and swing the wing members 56 in the manner previously described by the arrival of high portions on the cams 73 in the vicinity of the anti-friction rollers on the levers 72. This operation takes place at the phase of the machine cycle represented by the portion $d^1$ of line $d$ (Fig. 18) and, of course, while the wing members 56 are still in their forward positions. In this connection it will be observed that the pinions 69 on the shafts 58 are sufficiently long to maintain their engagement with the racks 70 on the bars 71 regardless of their fore and aft positions.

Figures 6, 7:
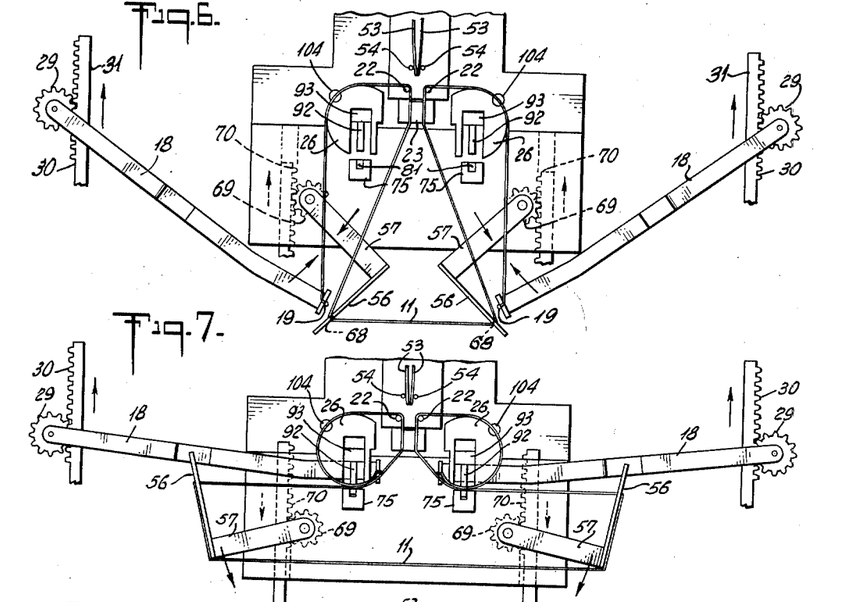

The arms 18, when their swinging movement has been completed, are brought to rest in the positions shown in Fig. 7 in which the ends of the strip material 11 are partially wrapped around the circular members 26. The wing members 56, when their rotation has been completed, are brought to rest in a position such that the opposite legs of the loop of strip material underlie the ends thereof in overlapping relation and in contact therewith. This occurs when the high portions of cams 36 and cams 73 are active. This period is represented by the portions $a''$ and $d''$ of the lines $a$ and $d$ respectively of the cam chart Fig. 18.

When the ends of the strip are overlapped as shown in Fig. 7, a pair of slides 75 move forwardly to present a buckle 14 (Fig. 15) directly beneath each of the overlapped portions. The front ends of the slides 75 in their rearward or normal positions are located each beneath a magazine 76 of buckles from which one buckle at a time is fed by gravity into a recessed portion 77 in the top face of the slide (Figs. 5 and 22).

The recess 77 is deep enough to receive a buckle 14 facewise with its top face flush with the upper face of the slide. A front and a rear wall 78 and 79 of the recess prevent relative movement of the buckle with respect to the slide in a fore and aft direction while abutments 80 at the side edges prevent relative movement in a lateral direction. The slide is also formed with a recess 81 cut inwardly from its front end for a purpose presently to appear.

The slides are guided in their fore and aft movements in a fixed part of the machine (Fig. 10). Each is fixed at the front end of a horizontal bar 82 which likewise is supported by a pair of fixed spaced supports 83 and 84 forming part of the machine frame. A compression spring 85 encircling each of the bars 82 reacts between the front face of its support 83 and a collar 86 fixed on the bar in advance of the support and serves to bias the slide for movement in a forward direction.

However, the slides 75 are held in their rearmost positions by a pair of arms 87 rigidly connected together at their upper ends by a sleeve 88 which encircles a transverse horizontal shaft 89 supported in bearings in the machine frame. The sleeve 88 is free to rotate with respect to the shaft 89 which, in so far as the arms 87 are concerned, merely acts as a support. The arms 87 are bifurcated at their lower ends to straddle the respective shafts 82 and bear against collars 90 fixed on the shafts rearwardly of the bifurcated portions.

The arm 87 at the right is provided, just below the shaft 89, with an anti-friction roller arranged to track along an edge cam 91 fixed on the upper main cam shaft 52 and which controls the fore and aft movement of the slides 75.

Figure 9:
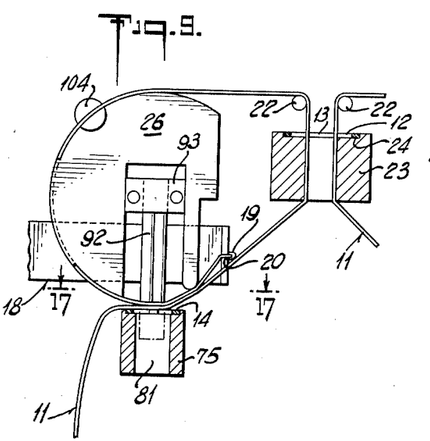
Fig. 9 is a front elevation of a portion of the machine with the parts in the position they assume when one end portion of the strip material is overlapped upon itself and just prior to application of a slide buckle.

A substantially long initial dwell on the cam 91 restrains the slides 75 in their normal or rearmost positions as indicated by portion $e'$ of line $e$ of cam chart Fig. 18, but immediately after the ends of the strip material 11 have been brought into overlapping relation as shown in Figs. 7 and 9, a drop in the cam 91 arrives opposite the anti-friction roller on the right arm 87 permitting both arms 87 to slide forward under the influence of their compression springs 85. At this phase of the machine cycle which is indicated by portion $e''$ of line $e$ on cam chart Fig. 18, a short low dwell on cam 91 permits the slides 75 to remain in their foremost positions until a pair of plungers 92 which overlie respectively the overlapped portions of the strip material move downwardly to push such overlapped portions through the gaps 16 in the buckle 14 in the manner previously described. The recesses 81 in the front end of the slides 75, which underlie the buckles 14 provide clearance for the plunger 92 in their downward movement. The plungers 92 are then retracted upwardly until they clear the buckles 14, the belt at this stage in the operation of the machine cycle actually being completed.

Each of the plungers 92 has rounded edges and is narrower in width at the center than nearer the edges in order that it may push the double layer of strip material 11 through the gap 16 in the buckle 14 without difficulty (Fig. 23). The plungers 92 are fixed at their upper ends to horizontal bars 93 whose front ends project into vertical guide slots 94 formed one in each of the circular members 26 around which the belt is wrapped (Fig. 1a). The bars 93 extend rearwardly for a short distance to clear the circular members 26 and near their rear ends are fixed to vertical bars 95 slidably mounted in fixed guide supports 96 for up and down movement. The bars 95 project above the top of their fixed guide supports 96 and at their upper ends, in spaced relation with the top of the guide support, there is affixed to each a horizontal leg of an angle clip 97, whose other end extends downwardly to a position adjacent the side faces of the respective guide supports. Encircling each of the vertical bars 95 and reacting between the opposed faces of its support and clip 97 associated therewith, there is a compression spring 98 which biases the bar 95 and consequently its associated plunger 92 in an upward direction. The normal positions of the plungers 92 however, are determined by horizontal pins 99, extending laterally from the clips 97 and which bear against and near the front ends of a pair of forwardly extending overlying lever arms 100. The lever arms 100 are fixed at their rear ends on a transverse horizontal rock shaft 101 which in turn, near its right end, has connected to it a lever arm 102 which extends upwardly to engage, through an anti-friction roller, an edge cam 103 mounted on the upper main cam shaft 52. The shape of the cam 103 is such that the plungers 92 are maintained in their uppermost positions until the buckles are presented beneath the overlapping portions of the strip whereupon a rise in the cam 103 rocks lever 102 forwardly and through its common interconnection with the levers 100, presses the vertical bars 95 downwardly against the reaction of the associated springs 98 to effect the functional action of the plungers 94 previously alluded to. This operation takes a relatively short period of time as indicated by portion $f'$ of the curve $f$ on cam chart Fig. 18. As soon as buckles 14 have been applied, a drop in the cam 103 permits restoration of the plungers 92 to their normal positions through the influence of the compression springs 98.

At this point in the machine cycle, restoration of all the other parts of the machine to their normal positions commences. The slides 75 are moved rearwardly, and the wing members 56 are both rotated and retracted back to their normal positions under the control of the cams 91, 73 and 67 respectively (Fig. 8). The timing of these operations is indicated by portions e''', d''', and c'' of lines e, d and c on cam chart Fig. 18.

Before restoration of arms 18 to their normal positions however, the completed belt is stripped from the arms and allowed to drop off the machine into a receptacle provided for the purpose. This operation is effected by a pair of stripper bars 104 normally located with their front ends behind the circular members 26 about which the strip material 11 is wound (Fig. 1a). The bars 104 are arranged for sliding movement in a fore and aft direction each in a pair of spaced uprights 105 and 106 fixed in the machine. They are normally biased to move in a forward direction by springs 107 which react between the front faces of the forward uprights 105 and collars 108 fixed to the bars in advance of such uprights. The bars 104 are maintained in their normal positions against the reaction of the springs 107 by mechanism which includes levers 109 whose lower bifurcated ends straddle the bars 104 and react against collars 110 fixed to the bars, and whose upper ends are pinned to rock shaft 89 to insure that both arms move in unison. The mechanism further includes an edge cam 111 mounted on the upper main cam shaft 59 and which is engaged by an anti-friction roller carried by the left arm 109 just below its pivot point and whose periphery is such that the bars 104 are normally held in their rearmost positions.

However, when the belt has been completed, a depression in cam 111 confronts the anti-friction roller on the left arm 109 and permits both arms 109 to swing forwardly under the reaction of the springs 107 to effect forward sliding movement of the stripper bars 104. The bars 104 are cut away to a half-round cross section at their front ends enabling them to slide into corresponding half-round depressions 112 in the circular members 26 and beneath the portions of the belt wrapped around the circular members 26. The bars 104 are further formed somewhat inwardly from their front ends with V-shaped notches 113 that engage the rear edge of the belt as said bars move forwardly to strip the belt off the circular members 26, off the pins 22, and out of the slots 20 in arms 18. When the bars 104 have reached the limit of their forward movement, the belt will stand clear of the circular members 26 and clear of the pins 22 and also will have dropped down in front of the circular members 26 such that when the stripping bars 104 are retracted the belt will disengage itself from the notches 113 in the bars 104 by engagement with the front faces of such circular members. When the belt has been disengaged from the stripper bars 104 it is free to drop from the machine as previously stated. The retraction of the stripper bars 104 to their normal positions is effected under the control of the cam 111 as a high portion thereof again confronts the anti-friction roller on the arms 109.

The final step in the completion of the machine cycle is a movement rearwardly of the triangular clip supporting slide 23 to a position for reloading and then forwardly to normal position and then restoration of the arms 18 to their normal positions ready to receive the next strip to be formed into a belt.

The slide 23 is presented at the front end of a bar 114 supported in a pair of spaced uprights 115 and 116 for sliding movement in a fore and aft direction. A spring 117 reacting between the front face of the forward support 115 and a collar 118 fixed on the bar in advance of such support biases the slide to its forward or normal position where a buckle 12 presented in the recess 24 in the slide is located directly beneath the strip material at the commencement of a machine cycle of operation. However, near the end of a machine cycle when the belt has been completed, a high portion on an edge cam 119 fixed on the upper cam shaft 52 engages an anti-friction roller carried by a lever arm 120 rotatably supported on and depending from the sleeve 88 which encircles the rock shaft 89. The anti-friction roller is located just beneath the pivot point of the lever arm 120 so that said arm is swung rearwardly when the high portion of cam 119 becomes effective. When this occurs the arm 120, at its lower end, which is bifurcated to straddle the bar 114, presses rearwardly against a collar 121 fixed on the bar 114, to move it to a position wherein the recess 24 in the front end of the slide 23 is presented beneath a vertical magazine containing the triangular clips 12. Gravity causes one of the clips 12 to be deposited in the recess 24 so that when the slide 23 again moves forwardly to its normal position by the reaction of spring 117 and as permitted by the edge cam 119 as the anti-friction roller on the arm 120 moves off the high portion thereof, there is again presented a triangular clip 12 in position to be applied to the next length of strip material which is inserted in the machine. The timing of the movement of the slide 23 rearwardly to its loading position and forwardly to its normal position is indicated by portion h' of line h in the cam chart (Fig. 18).

After slide 23 has returned to its normal position, arms 18 are rotated outwardly and restored to their normal positions ready to receive a new strip of material for processing in the next machine cycle of operation. This occurs as low portions of the cams 36 arrive opposite the anti-friction rollers on the arms 33 permitting vertical bars 31 to move downwardly under the action of springs 32.

This invention has been described in connection with one embodiment thereof but it will be understood that many other embodiments are comprised within its spirit. The invention is to be limited therefore only by the scope of the appended claims.

What is claimed is:

1. A machine for attaching to limp flexible strip material a buckle with frame having transverse means presenting an intermediate gap, said machine including, in combination, a form about which the strip material may be wrapped, devices adjacent the form and movable relatively thereto for wrapping the strip material around the form with one portion of the strip material in facewise overlapping engagement with another portion of the strip material, mechanism movable to present one such buckle in facewise proximity to the overlapped portions of strip material on said form, means associated with the form and movable relatively to the buckle presenting mechanism for passing the overlapped portions of strip material thereon through the gap in the buckle, and mechanism including timing devices incorporated in the machine for operating the movable wrapping devices, the buckle presenting mechanism and the means for passing the overlapped portions of strip material through the gap, all in a given sequence.

2. A machine for attaching to limp flexible strip material a buckle with a frame having transverse means presenting an intermediate gap, said machine including, in combination, a form about which the strip material may be wrapped, devices adjacent the form movable relatively thereto for wrapping the strip material around the form with one portion of the strip material in facewise overlapping engagement with another portion of the strip material, a magazine containing a plurality of such buckles, mechanism adapted in one position to receive a buckle from the magazine and in another position to present the buckle in facewise proximity to the overlapped portions of strip material on said form, means associated with the form and movable relatively to the buckle presenting mechanism for pushing the overlapped portions of strip material through the gap in the buckle when the same is thus presented, and mechanism including timing devices incorporated in the machine for operating the movable wrapping devices, the buckle presenting mechanism between its different positions, and the pushing means all in a given sequence.

3. A machine for attaching to limp flexible strip material a buckle with frame having transverse means presenting an intermediate gap, said machine including, in combination, a form about which the strip material may be wrapped, means including a rotatable arm for supporting the strip in the vicinity of the form, means for rotating said arm with movement relative to the form to wrap a portion of the strip in one direction around the form, a second rotatable arm, means for rotating the second arm likewise with movement relative to the form to wrap a different portion of the strip in the opposite direction around the form and in facewise overlapping relation with the first portion wrapped therearound, a magazine containing a plurality of such buckles, mechanism adapted in one position to receive a buckle from the magazine and in another position to present the buckle in facewise proximity to the overlapped portions of the strip material on said form, means associated with the form and movable relatively to the buckle presenting mechanism for pushing the overlapped portions of strip material through the gap in the buckle when the same is thus presented, and timing devices incorporated in the machine for controlling the sequential operation of the rotatable arms, the buckle presenting means and the pushing means.

4. A combination according to claim 1 wherein there is also included as part thereof stripping means controlled from said timing devices acting to remove the strip material from the form after the buckle has been applied.

5. A combination according to claim 2 wherein there is also included as part thereof stripping means controlled from said timing devices acting to remove the strip material from the form after the buckle has been applied.

6. A combination according to claim 3 wherein there is also included as part thereof stripping means controlled from said timing devices acting to remove the strip material from the form after the buckle has been applied.

7. A machine for making a closed belt from limp strip material and with adjustable buckles having each a frame with transverse means presenting an intermediate gap, said machine including, in combination, a pair of spaced forms, a pair of rotatable arms adapted to hold the strip material in stretched condition with its midpoint substantially centralized with respect to the forms, a holder for presenting an apertured clip between the forms and adjacent the stretched strip material, means for rotating said arms with movement relative to the form to wrap opposite ends of the strip about the adjacent forms, means adjacent the apertured clip holder and operable during the rotation of said arms to pass the center section of the strip material through the apertured clip to form a loop, means movable relatively to the forms for wrapping opposed sides of the loop about the adjacent forms in overlapping relation with the ends of said strip, means for presenting an adjustable buckle adjacent each of the overlapped portions of the strip material on said forms, means associated with the forms and movable relatively to their respective buckle presenting means for passing the overlapped portions of the strip material through the gaps in the adjustable buckles, and means including timing devices incorporated in the machine for controlling the operation in given sequence of the rotatable arms, the means for passing the strip through the apertured clip, the means for wrapping the opposed sides of the loop about the forms and the means for passing the overlapped portions of the strip material through the gaps in the adjacent buckles.

8. A combination according to claim 7 which includes also devices operable to strip the belt off the forms after application of the adjustable buckles thereto with operating mechanism therefor controlled from the same controlling means.

9. A combination according to claim 7 wherein the means for passing the strip material through the apertured clip includes a pusher member movable from a normal position above the holder for presenting the apertured clip between the forms to push a portion of the strip through the clip to form a loop therebelow.

10. A combination according to claim 9 wherein the pusher member at its functional end is provided with a pair of leaf springs which react against the strip material forming the loop to prevent twisting thereof.

11. A combination according to claim 7 wherein there is also provided a magazine of apertured clips and wherein the holder for presenting an apertured clip adjacent the stretched strip material is movable under the control of the controlling means from a position beneath the strip material where the clip is applied to the strip to a position adjacent the magazine where a clip is deposited in the holder.

12. A combination according to claim 7 wherein the means for wrapping the opposed sides of the loop around the forms in overlapping relation with the ends of the strip includes a pair of arms provided with strip engaging means and which are rotatable in opposite directions under the control of the controlling means to engage different portions of the loop to effect the overlapping thereof with the ends of the strip.

13. A combination according to claim 7 wherein the means for wrapping the opposed sides of the loop around the forms in overlapping relation with the ends of the strip include a pair of arms provided with strip engaging means which, under the control of the controlling means, are movable from an inactive position to an active position within the loop, and which, likewise under the control of the controlling means are rotatable by the arms in opposite directions to engage different portions of the loop to effect the overlapping thereof with the ends of the strip.

14. A combination according to claim 9 wherein the pusher member at its functional end is provided with a pair of leaf springs which react against the strip material to spread the opposite legs of the loop apart and wherein the means for wrapping the opposite legs of the loop around the forms in overlapping relation with the ends of the strip include a pair of arms provided with strip engaging means which, under the control of the controlling means, are movable from an inactive position to an active position within the loop and between the springs, and which, likewise under the control of the controlling means are rotatable by the arms in opposite directions to engage the opposite legs of the loop to effect the overlapping thereof with the ends of the strip.

15. A combination according to claim 7 wherein two magazines of adjustable buckles are provided and wherein the means for presenting the adjustable buckles adjacent each of the overlapped portions of strip material include duplicate holders movable under the control of the controlling means from a position adjacent the magazines where an adjustable buckle is deposited in each of the holders to a position adjacent the overlapped portions of the strip material where the buckles are applied.

16. A combination according to claim 7 wherein the means for passing the overlapped portions of the strip material through the gaps in the adjustable buckles include a pair of plungers normally retracted one within the confines of each of the forms about which the strip material is wrapped and which are movable under the control of the controlling means to press the overlapped portions of the strip material through the gaps in said buckles when the means presenting the adjustable buckles have been moved adjacent the overlapped portions of the strip.

References Cited in the file of this patent

UNITED STATES PATENTS

| | | |
|---|---|---|
| 1,579,416 | Tillotson | Apr. 6, 1926 |
| 1,991,172 | Platt | Feb. 12, 1935 |
| 2,274,795 | Klock et al. | Mar. 2, 1942 |
| 2,526,187 | Alfandre | Oct. 17, 1950 |